United States Patent
Wang et al.

(10) Patent No.: US 9,391,466 B2
(45) Date of Patent: Jul. 12, 2016

(54) METHOD AND DEVICE FOR BATTERY-CHARGING MANAGEMENT

(71) Applicant: Tencent Technology (Shenzhen) Company Limited, Shenzhen (CN)

(72) Inventors: Qing Wang, Shenzhen (CN); Haoran Guo, Shenzhen (CN); Yixia Yuan, Shenzhen (CN); Xunchang Zhan, Shenzhen (CN); Chunyou Lin, Shenzhen (CN); Pengtao Li, Shenzhen (CN); Jiashun Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 487 days.

(21) Appl. No.: 14/010,460

(22) Filed: Aug. 26, 2013

(65) Prior Publication Data

US 2014/0035514 A1    Feb. 6, 2014

Related U.S. Application Data

(63) Continuation of application No. PCT/CN2013/080650, filed on Aug. 1, 2013.

(30) Foreign Application Priority Data

Aug. 6, 2012 (CN) .......................... 2012 1 0277210

(51) Int. Cl.
| | |
|---|---|
| *H02J 7/00* | (2006.01) |
| *H02J 7/04* | (2006.01) |
| *H02J 7/16* | (2006.01) |
| *H04W 52/02* | (2009.01) |
| *H04M 1/725* | (2006.01) |

(52) U.S. Cl.
CPC ......... *H02J 7/0047* (2013.01); *H04W 52/0248* (2013.01); *H04W 52/0261* (2013.01); *H02J 7/041* (2013.01); *H02J 2007/005* (2013.01); *H04M 1/72519* (2013.01)

(58) Field of Classification Search
CPC ..................................................... H02J 7/0047
USPC ......................................................... 320/132
See application file for complete search history.

(56) References Cited

U.S. PATENT DOCUMENTS

| | | | | |
|---|---|---|---|---|
| 6,617,829 B1 * | 9/2003 | Smith | ................... | H02J 7/0047 320/134 |
| 2002/0079868 A1 | 6/2002 | Gaza | | |
| 2004/0066171 A1 * | 4/2004 | Mori | ...................... | G06F 1/263 320/132 |
| 2005/0134222 A1 * | 6/2005 | Stinson | ................. | H02J 7/0075 320/128 |
| 2011/0127947 A1 * | 6/2011 | Hunter | .................. | H02J 7/0031 320/104 |

* cited by examiner

FOREIGN PATENT DOCUMENTS

| | | |
|---|---|---|
| CN | 2674742 Y | 1/2005 |
| CN | 102157759 A | 8/2011 |
| JP | H 05137271 A1 | 6/1993 |

OTHER PUBLICATIONS

Tencent Technology, ISRWO, PCT/CN2013/080650, Nov. 7, 2013, 8 pgs.
Tencent Technology, IPRP, PCT/CN2013/080650, Feb. 10, 2015, 5 pgs.

*Primary Examiner* — Edward Tso
*Assistant Examiner* — Ahmed Omar
(74) *Attorney, Agent, or Firm* — Morgan, Lewis & Bockius LLP (57) ABSTRACT

A method, a computer-readable medium, and a system for battery-charging management are provided. The method comprises: recording a respective time that previous trickle charging was carried out by a user; determining that a time interval between a current time and the respective time for the previous trickle charging has reached a preset charging cycle; and prompting the user to carry out next trickle charging in response to determining that the time interval between the current time and the respective time for the previous trickle charging has reached the preset charging cycle. The charging cycle is managed according to recorded charging actions of a user; therefore, the user can be prompted and guided in an intuitive and clear way to carry out charging cycle management, and be prompted intelligently and regularly, so as to extend the service life of a battery.

20 Claims, 4 Drawing Sheets

METHOD AND DEVICE FOR BATTERY-CHARGING MANAGEMENT

RELATED APPLICATIONS AND PRIORITY CLAIMS

This application is a continuation application of PCT Patent Application No. PCT/CN2013/080650, entitled "Method and Device for Battery-Charging Management", filed on Aug. 1, 2013, which claims priority to Chinese Patent Application No. 201210277210.6, entitled "Method and Device for Battery-Charging Management", filed on Aug. 6, 2012, both of which are incorporated herein by reference in their entireties.

TECHNICAL FIELD

The present invention relates to the technical field of battery management, and particularly, to a method and device for battery-charging management.

BACKGROUND

With the development of science and technology, the cell phone has become a necessary tool for modern people in life; and with the popularization of smart phones with big screens, high luminance and high performance, battery capacity has become the main bottleneck restricting the sustained use of cell phones, and the amount of remaining charge of a lithium battery will quickly decrease after going through unreasonable repeated charging and discharging. For example, actions such as charging for a long time after saturation, no trickle charging ever being carried out during the stipulated cycle, and keeping the battery in the low electricity running stage for a long time and so on will all do harm to the lithium battery. A good battery-charging habit is necessary for extending the service life of the battery. Generally speaking, regular trickle charging has a good protective effect on the lithium battery. Trickle charging refers to charging with a continuous small current to keep the storage battery in an approximately fully-charged state so as to make up the capacity loss caused by self-discharging after the battery has been fully charged, which is also called "maintenance charging" (float charging).

The battery-charging management solution in the prior art only prompts a user to carry out charging in time when a battery's available amount of remaining charge is below a certain limit and can only send out charging prompts singularly according to the available amount of remaining charge but not according to the charging cycles. Therefore, it is impossible for the user to be prompted and guided in an intuitive and clear way to carry out charging cycle management, or prompted intelligently and regularly, so as to extend the service life of the battery.

SUMMARY

In order to solve the problems in the prior art, the embodiments of the present invention provide a method and device for battery-charging management. The technical solution is as follows:

on one hand, a method for battery-charging management is provided, and the method comprises: recording a respective time that previous trickle charging of a device battery was carried out by a user; determining that a time interval between a current time and the respective time for the previous trickle charging has reached a preset charging cycle; and prompting the user to carry out next trickle charging of the device batter in response to determining that the time interval between the current time and the previous trickle charging has reached the preset charging cycle.

On the other hand, a device for battery-charging management is provided, and the device comprises a charge recording unit and a first prompting unit, wherein the charge recording unit is used for recording a respective time for previous trickle charging of a device battery carried out by a user; and the first prompting unit is used for prompting the user to carry out next trickle charging when it is determined that the time interval from the previous trickle charging has reached a preset charging cycle.

The beneficial effects of the technical solution provided in the embodiments of the present invention are as follows: whether the time interval from the previous trickle charging to the current time has exceeded a preset charging cycle is determined by recording the time for trickle charging carried out by a user and comparing same with the preset charging cycle, and if yes, the user is prompted to carry out trickle charging again; otherwise, there is no need to prompt the user and the user continues to use the battery normally. Furthermore, the embodiments of the present invention can combine with a calendar to record the time for the charging carried out by the user on the calendar, which can not only prompt the user to carry out trickle charging again but also prompt the user of the time when next trickle charging is needed after the charging has been completed. In the embodiments of the present invention, the charging cycle is managed according to recorded charging actions of a user; therefore, the user can be prompted and guided in an intuitive and clear way to carry out charging cycle management, and be prompted intelligently and regularly, so as to extend the service life of a battery.

DESCRIPTION OF THE DRAWINGS

In order to more clearly illustrate the technical solution in the embodiments of the present invention, the figures to be used for describing the embodiments will be outlined hereinafter, and apparently, the figures described hereinafter are merely some embodiments of the present invention, and for a person skilled in the art, other figures can be obtained according to these figures without any inventive efforts.

DETAILED DESCRIPTIONS

In order to make technical solution and advantages of the present invention more clear, the embodiments of the present invention will be further described in detail in conjunction with the accompanying drawings.

Embodiment I

Figure 1:
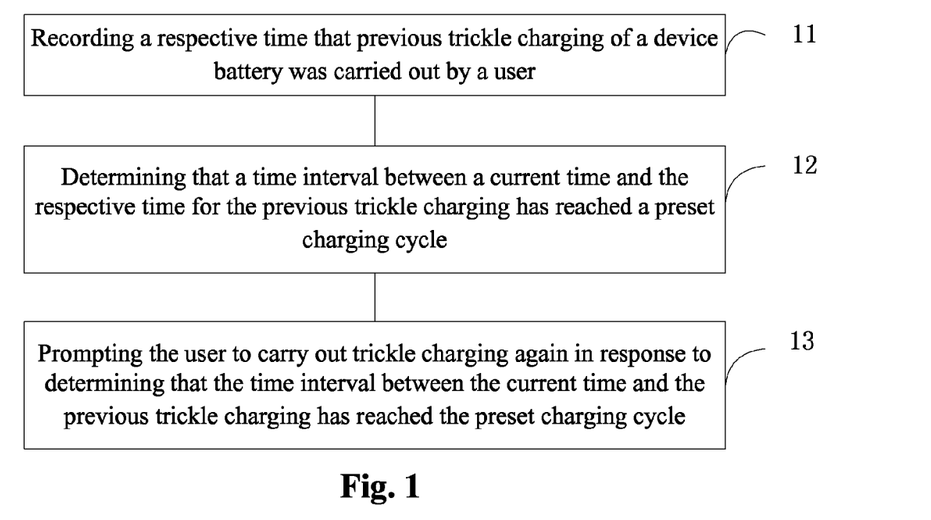
FIG. 1 is a flow chart of a method for battery-charging management in accordance with some embodiments.

Referring to FIG. 1, a schematic flow chart of a method for battery-charging management is provided in accordance with some embodiments, and is particularly as follows:

Step 11, recording a respective time that previous trickle charging of a device battery was carried out by a user. For example, when the user chooses a trickle battery charging mode from a battery management program interface, and continues the trickle charging for a predetermined amount of time or until a predetermined threshold battery capacity is reached, the battery management program records the start and end time for the trickle charging in a system or user calendar. In some embodiments, when the battery management program creates a calendar entry for the completed trickle charging in a user's calendar stored on the device, and the calendar entry for the completed trickle charging can be displayed concurrently with other user-created calendar entries (e.g., calendar entries for shopping, appointments, etc.) in the same user calendar interface. In some embodiments, the battery management program allows the user to select the charging voltage and charging time for the trickle charging within recommended voltage and charging time ranges.

Step 12, determining that a time interval between a current time and the respective time for the previous trickle charging has reached a preset charging cycle. For example, in some embodiments, the charging management program maintains a table of one or more preset charging cycles for each of a plurality of types of battery charging modes, such as a trickle charging mode, a short time charting mode, a normal charging mode. In some embodiments, the charging management program determines the optimal charging cycle for each mode based on the user's past usage and charging behaviors, the battery type, the current battery condition, etc. In some embodiments, in addition to creating a calendar entry for the previous trickle charging carried out by the user, the battery management program further creates a calendar entry for the next trickle charging to be carried out by the user, where the recommended time for the next trickle charging is determined based on the time of the previous trickle charging and the stored preset charging cycle for trickle charging. In some embodiments, when the user browses the calendar interface, the user can find out when the recommended time for the next trickle charging will be based on the calendar entry created for the next trickle charging. In some embodiments, a charging cycle for trickle charging can be in the range of several days or several weeks.

Step 13, prompting the user to carry out next trickle charging in response to determining that the time interval between the current time and the previous trickle charging has reached the preset charging cycle. In some embodiments, the prompting is in the form of a pop-up calendar reminder. In some embodiments, the prompting changing an appearance of a battery indicator displayed on the device. For example, normally, a battery indicator displayed on the device shows a current battery level, when the recommended time for the next trickle charging has been reached, the battery management program optionally changes the visual appearance of the battery indicator to indicate to the user that the trickle charging is now recommended. For example, in some embodiments, the color of the battery icon can be changed from a first color to a second color, and/or the appearance of the battery icon can start blinking, and/or other animated versions of the battery icon can be displayed.

In the embodiments of the present invention, the time for trickle charging carried out by the user is recorded to prompt the user of the time for next trickle charging. The recording method can be invoking a system calendar and marking the time for trickle charging on the calendar. Meanwhile, a charging cycle also needs to be preset to monitor the time interval between the current time and the time for the previous trickle charging, and if the time interval is greater than or equal to the preset charging cycle, the user will be prompted to carry out trickle charging again.

Embodiment II

Figure 2:
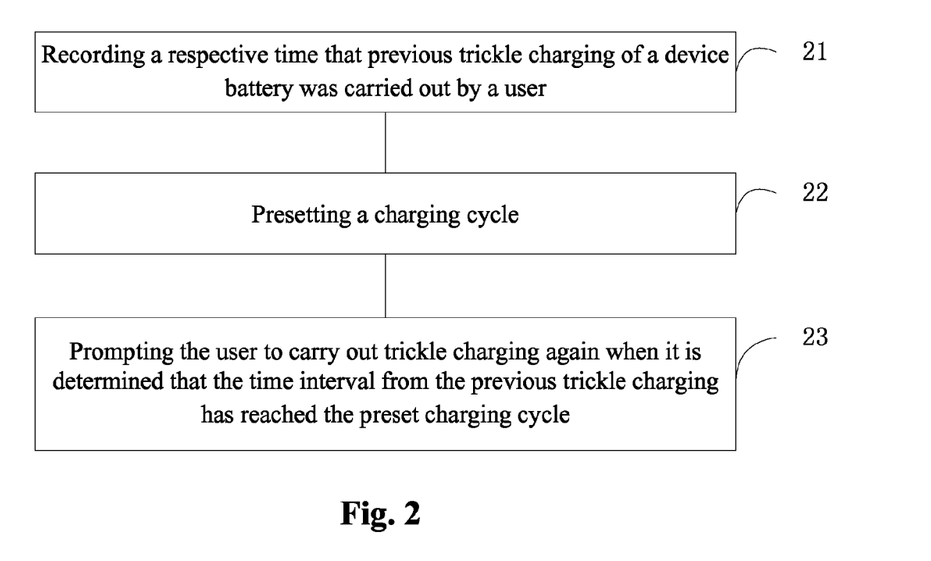
FIG. 2 is a flow chart of a method for battery-charging management in accordance with some embodiments.

Referring to FIG. 2, a schematic flow chart of a method for battery-charging management is provided in accordance with some embodiments, and is particularly as follows:

Step 21, recording a respective time that previous trickle charging of a device battery was carried out by a user.

Generally speaking, charging actions conducted by a user on a lithium battery comprise short time charging, normal charging and trickle charging, and what is primarily conducted in this embodiment is recording the time for the charging carried out by the user, especially the time for trickle charging. The recording method can generally be invoking a system calendar or user calendar or generating a calendar entry automatically to mark the time for the previous trickle charging on the calendar. In some embodiments, the time for each charging carried out by the user is marked on the calendar; hence, not only the history records of the user's charging actions can be seen plainly, but also whether the user's charging actions are healthy or reasonable can be determined according to the records. In this embodiment, the time for short time charging and/or normal charging carried out by the user can also be recorded. Furthermore, the recorded time for short time charging and/or normal charging carried out by the user can also be marked on the calendar.

Step 22, presetting a charging cycle.

The charging cycle here refers to a trickle charging cycle, that is, the system provides a suggestion suggesting that the user should conduct trickle charging within a certain time interval to protect the lithium battery. For example, Apple Inc. suggests carrying out trickle charging on the lithium batteries of Apple's products at least once a month. Of course, the charging cycle of trickle charging here can be set by the user as required, and can be adjusted at any time. In some embodiments, the battery management program determines the suitable charging cycles for each type of charging based on the historic records of the user's charging actions and the discharging behaviors of the device.

Step 23, prompting the user to carry out trickle charging again when it is determined that the time interval from the previous trickle charging has reached a preset charging cycle.

Monitoring, at any moment, the time interval between the current system time and the time for the previous trickle charging carried out by the user; if the time interval exceeds the preset charging cycle, it means the user has not conducted trickle charging during the preset cycle, and the user should be prompted to carry out trickle charging again so as to keep a good charging habit. Otherwise, the user uses the battery normally and no prompt will be given out.

Furthermore, when the user has completed the trickle charging, the user can be further prompted the time left between now and the next trickle charging. Specific actions are: recording the time for previous trickle charging carried out by the user, calculating the time for the next trickle charging to be carried out by the user according to the preset charging cycle and prompting the user. The benefit of doing so is that the user can have an intuitive impression on the next trickle charging after a current trickle charging has been completed, thus facilitating the use time arrangement of battery by the user.

Furthermore, a threshold amount of remaining charge can be set in advance, so as to determine at any moment whether the battery's amount of remaining charge is below the threshold amount of remaining charge, and if yes, the user is prompted to carry out charging again. The charging here can be not only short time charging, but also normal charging or trickle charging.

Of course, it is mentioned above that all the user's charging actions can be marked on the calendar, that is, the user's short time charging, normal charging and trickle charging can be marked, and then a user charging action cycle can be set to prompt the user to carry out charging again in the cycle.

In some embodiments, the battery management program prompts the user to carry out normal charging of the device battery when it is determined that the device battery's amount of remaining charge is below a first preset threshold. In some embodiments, the battery management program prompts the user to carry out short time charging of the device battery when it is determined that the device's battery's amount of remaining charge is below a second preset threshold. In some embodiments, other factors are taken into account when determining whether to recommend normal charging or short time charging. In some embodiments, the threshold amount of remaining charge for normal charging is lower than the threshold amount of remaining charge for short time charging. In some embodiments, normal charging is a charging mode in which a relatively high charging voltage is applied for an extended period of time until a predetermined battery capacity (e.g., 100%) is reached. In some embodiments, normal charging is recommended, when the battery level is very low (e.g., less than 10%). In some embodiments, short time charging is a charging mode in which a relatively high charging voltage is applied for a relatively short time until a predetermined battery capacity (e.g., 100% or 80%) is reached. In some embodiments, short time charging is recommended, when the battery level is not very low, but can benefit from replenishment, or when the battery level is close to full and extended recharging at the relatively high voltage may adversely affect the battery's performance. In some embodiments, trickle charging is a charging mode in which a relatively low charging voltage is applied for an extended period of time when the battery level is close to full (e.g., 99-100%), such that battery capacity may be maximized (e.g., slightly above the nominal 100% capacity).

In some embodiments, the battery management program determines the amount of remaining charge and a rate of discharge for the device battery; and based on the determined amount of remaining charge and rate of discharge, the battery management program determines whether to prompt the user for normal recharging or trickle recharging. For example, in some embodiments, when the battery management program determines that the remaining charge is above a high charge threshold (e.g. 99%), and the rate of discharge is below a low discharging threshold (e.g., 0.5% per hour), the battery management program determines that a trickle charging mode is recommended. Thus, the battery management program presents a prompt for trickling charging. Alternatively, when the battery management program determines that the remaining charge is below a low charge threshold (e.g., 10% or 50%), and the rate of discharge is above a high discharging threshold (e.g., 25% per hour), the battery management program determines that a normal charging mode is recommended. Based on the recommended charging mode, the battery management program displays the appropriate visual indicator or prompts the user for the recommended charging mode to the user.

Figure 5:
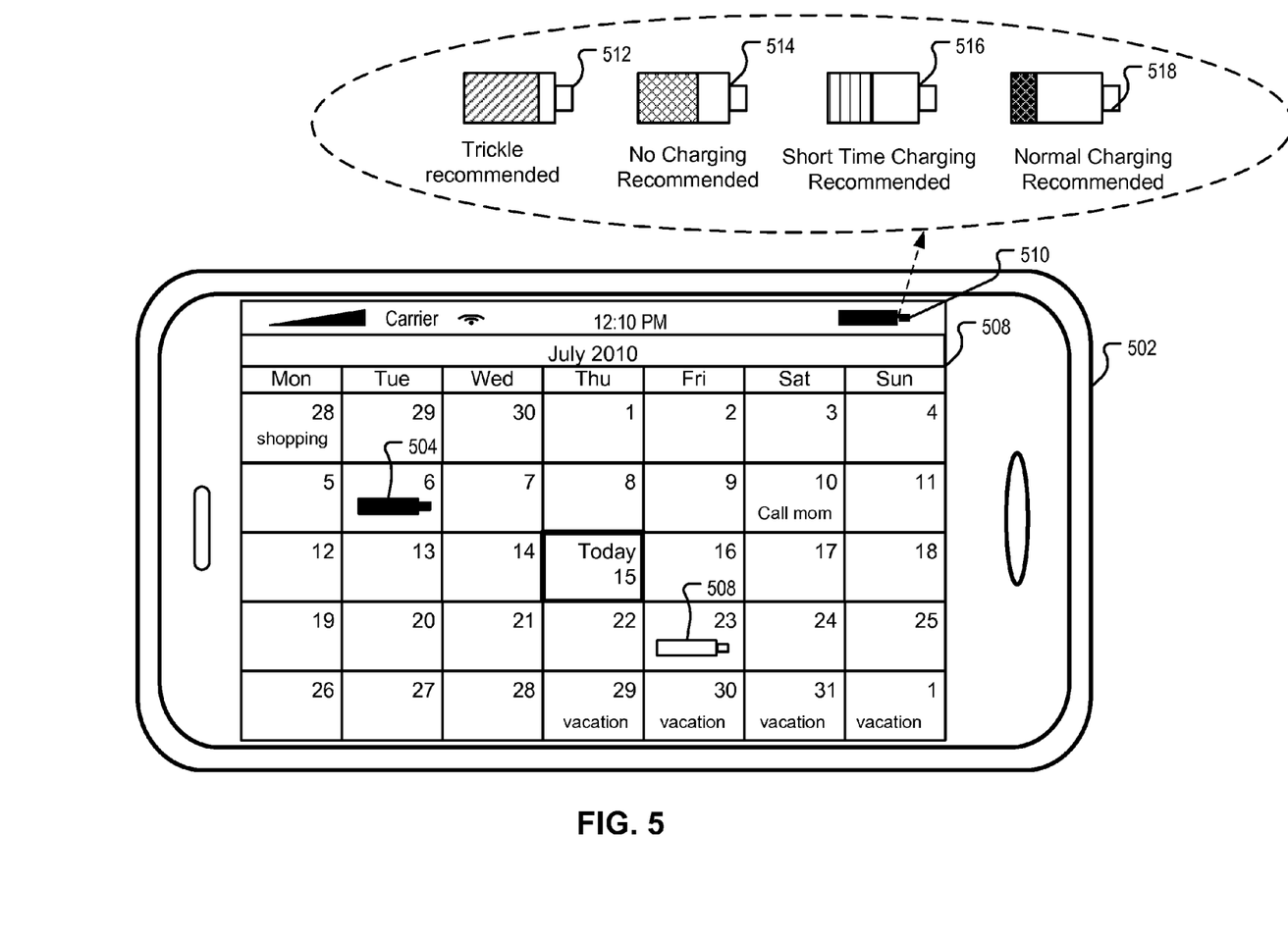
FIG. 5 is an exemplary graphical user interface for battery-charging management in accordance with some embodiments.

In some embodiments, the battery managing program provides a plurality of battery charging modes on the device, including at least two of a normal charging mode, a short time charging mode, and a trickle charging mode; and varies a visual appearance of a battery charging indicator displayed on the device in accordance with a respective one of the plurality of charging modes currently recommended for recharging the device battery. FIG. 5 illustrates an example battery charging indicator that can be displayed on a device to show the different recommended charging modes. In some embodiments, when the user selects a particular charging mode based on the recommendation, the battery charging program automatically adjusts the charging time and charging voltage/current based on the selected charging mode during the actual charging process.

In the embodiments of the present invention, whether the time interval from the previous trickle charging to the current time has exceeded a preset charging cycle is determined by recording the time for trickle charging carried out by a user and comparing same with the preset charging cycle, and if yes, the user will be prompted to carry out trickle charging again; otherwise, there is no need to prompt the user and the user continues to use the battery normally. Furthermore, the embodiments of the present invention can combine with a calendar, and record the time for the charging carried out by the user on the calendar, which can not only prompt the user to carry out trickle charging again but also prompt the user of the time when next trickle charging is needed after the charging has been completed. In the embodiments of the present invention, the charging cycle is managed according to recorded charging actions of a user; therefore, the user can be prompted and guided in an intuitive and clear way to carry out charging cycle management, and be prompted intelligently and regularly, so as to extend the service life of a battery.

Embodiment III

Figure 3:
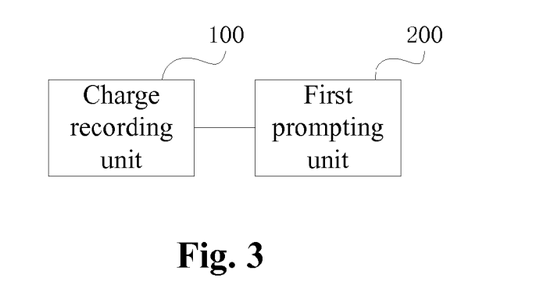
FIG. 3 is a first structural schematic diagram of a device for battery-charging management provided in accordance with some embodiments.

Referring to FIG. 3, a device for battery-charging management is provided in accordance with some embodiments, the device comprising: a charge recording unit 100, and a first prompting unit 200, wherein the charge recording unit 100 is used for recording the time for trickle charging carried out by a user; and the first prompting unit 200 is used for prompting the user to carry out trickle charging again when it is determined that the time interval from the previous trickle charging has reached a preset charging cycle.

Preferably, the charge recording unit 100 is further used for recording the time for short time charging and/or normal charging carried out by the user.

Figure 4:
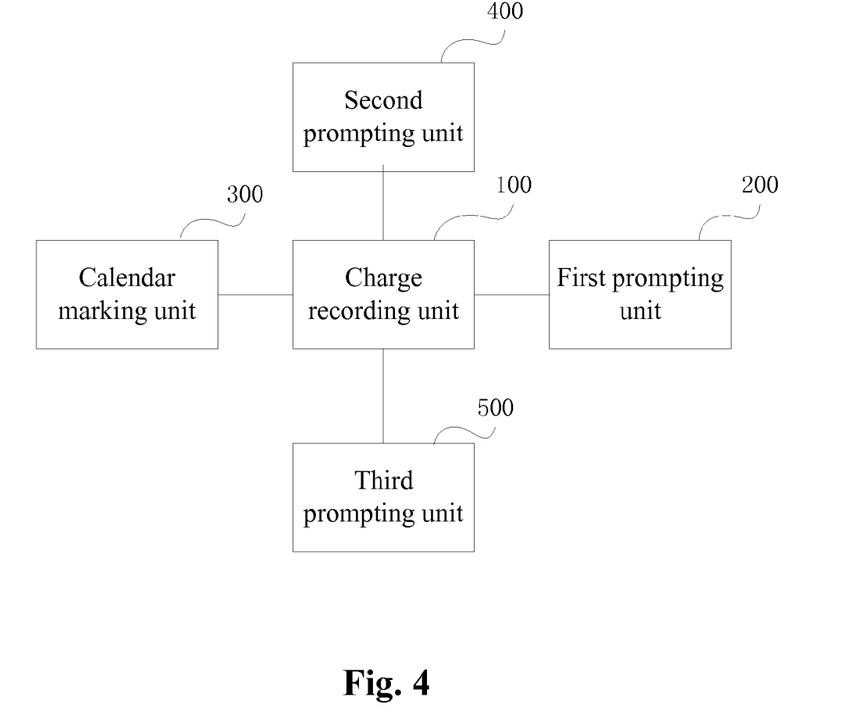
FIG. 4 is a second structural schematic diagram of a device for battery-charging management provided in accordance with some embodiments.

Referring to FIG. 4, the abovementioned battery-charging management device further comprises a calendar marking unit 300 for marking, on a calendar, the time for trickle charging carried out by the user, as recorded by the charge recording unit 100.

Preferably, the device for battery-charging management further comprises a second prompting unit 400, for prompting the user of the time left to next trickle charging according to the preset charging cycle after the user has completed the trickle charging.

Preferably, the abovementioned battery-charging management device further comprises a third prompting unit 500 for prompting the user to carry out charging again when it is determined that the battery's amount of remaining charge is below a preset threshold amount of remaining charge.

In some embodiments, device includes other units and modules to provide other functions described above with respect to FIGS. 1 and 2.

In the embodiments of the present invention, whether the interval from the previous trickle charging to the current time has exceeded a preset charging cycle is determined by recording time for trickle charging carried out by a user and comparing same with the preset charging cycle, and if yes, the user will be prompted to carry out trickle charging again; otherwise, there is no need to prompt the user and the user continues to use the battery normally. Furthermore, the embodiments of the present invention can combine with a calendar, and record the time for charging carried out by the user on the calendar, which can not only prompt the user to carry out trickle charging again but also prompt the user of the time when next trickle charging is needed after the charging has been completed. The charging cycle is managed in the embodiments of the present invention according to the recorded charging actions of the user; therefore, the user can be prompted and guided in an intuitive and clear way to carry out charging cycle management, and be prompted intelligently and regularly, so as to extend the service life of a battery.

FIG. 5 is an exemplary user interface provided by a device 502 on which a battery management program described above provides battery-charging reminders and recommendations.

As shown in FIG. 5, when a user browses a user calendar stored on the device 502, a calendar entry 504 for at least one of the previous trickle charging carried out by the user is displayed for the date and time of the at least one previous trickle charging (e.g., Jul. 6, 2010) in the interface 506 of a user calendar. As described above, the the calendar entry 504 is automatically created by the battery management program based on the user's charging action, and without specific user manipulation of the calendar program or interface. In addition, another calendar entry 508 for the next trickle charging to be carried out by the user is displayed for the date and time of the next trickle charging (e.g., Jul. 23, 2010) in the interface 506 of the user calendar. As described above, the calendar entry 508 is also automatically created by the battery management program based on the user's charging action, and without specific user manipulation of the calendar program or interface. In some embodiments, in response to a selection of the calendar entry 508, a user interface element for invoking a user interface of the battery management program is displayed, and the user can adjust different aspects of the battery management function through the user interface. Although the calendar interface 506 in FIG. 5 merely shows the calendar entries for one previous trickle charging action and one next trickle charging action, in various embodiments, calendar entries for other types of charging can also be displayed in the calendar interface 506.

As shown in FIG. 5, a battery indicator 510 is displayed in a system status display portion of the device 502. A conventional battery indicator shown on a conventional device interface typically indicates the amount of charge still remaining in the device battery, e.g., a battery icon with a level indicator (e.g., 50%, 10%, etc.). Sometimes, when the device battery is being recharged, the conventional battery indicator has a different appearance to indicating that it is currently being charged. As shown in FIG. 5, the battery indicator 510 is further configured to indicate the type of charging recommended for the present time. For example, if trickle charging is recommended at the present time, (e.g., either based on the automatic scheduling, or based on the current usage and battery level statuses), the battery indicator 510 takes on the appearance of the icon 512. If no charging is recommended (e.g., based on the current usage and battery level statuses) at the present time, the battery indicator 510 takes on the appearance of the icon 514. If short time charging is recommended at the present time, (e.g., either based on the automatic scheduling, or based on the current usage and battery level statuses), the battery indicator 510 takes on the appearance of the icon 516. If normal charging is recommended at the present time, (e.g., either based on the automatic scheduling, or based on the current usage and battery level statuses), the battery indicator 510 takes on the appearance of the icon 518. In some embodiments, the different icons 512, 514, 516, and 518 each displays a respective threshold amount of remaining charge (e.g., 99%, 80%, 40%, and 20%) associated the corresponding type of charging or no-charging actions. In some embodiments, the different icons 512, 514, 516, and 518 each has a respective color that is associated with the corresponding type of charging or no-charging actions. Other variations in the appearance of the battery indicator 510 are possible.

Figure 6:
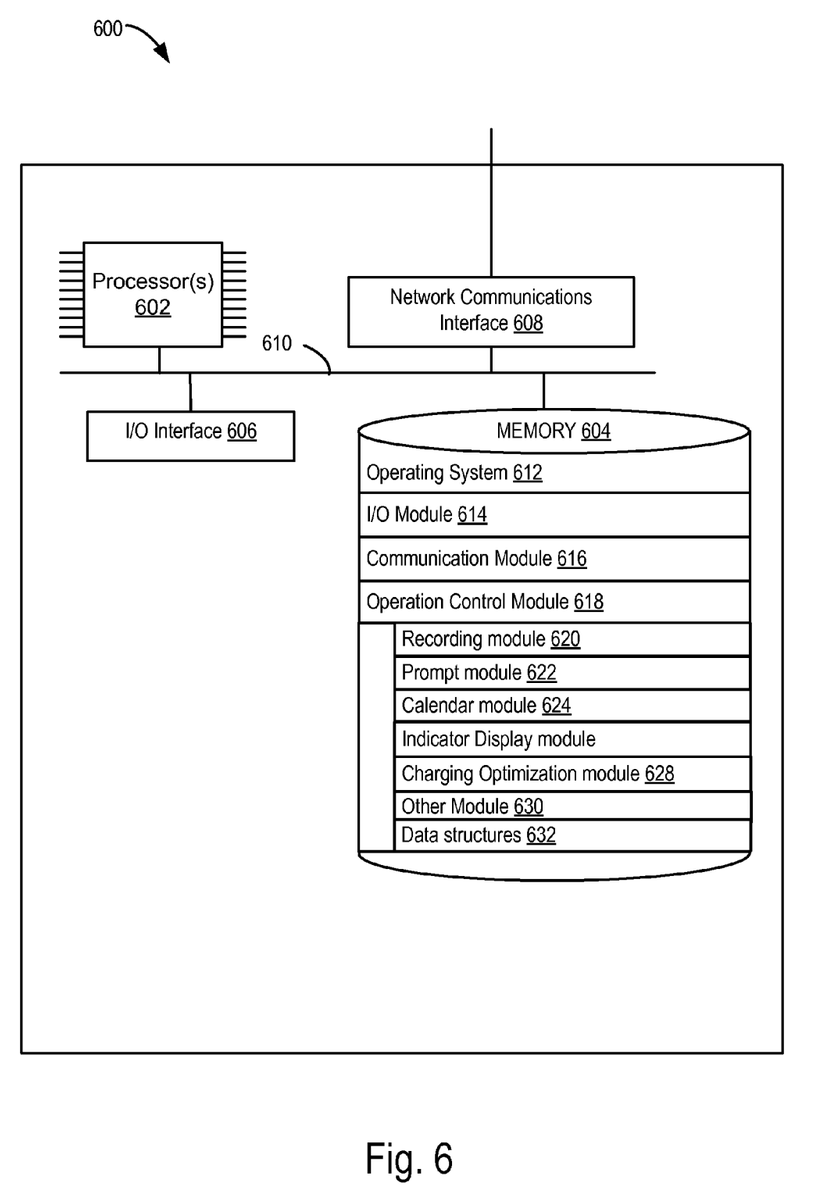
FIG. 6 is an exemplary system for battery-charging management in accordance with some embodiments.

FIG. 6 is a block diagram of a system 600 for implementing the method of providing battery-charging management, as described above, in accordance with some embodiments. In some embodiments, the system 602 is one of: a mobile device, a handheld computer, and a tablet computer.

As shown in FIG. 6, the system 600 includes one or more processing units (also called herein "processors") 602, memory 604, an input/output (I/O) interface 606, and a network communications interface 608. These components communicate with one another over one or more communication buses or signal lines 610. In some embodiments, the memory 604, or the computer readable storage media of memory 604, stores programs, modules, instructions, and data structures including all or a subset of: an operating system 612, an I/O module 614, a communication module 616, application programs 618, and an operation control module 624. The one or more processors 602 are coupled to the memory 604 and operable to execute these programs, modules, and instructions, and reads/writes from/to the data structures.

In some embodiments, the processing units 602 include one or more microprocessors, such as a single core or multi-core microprocessor. In some embodiments, the processing units 602 include one or more general purpose processors. In some embodiments, the processing units 602 include one or more special purpose processors.

In some embodiments, the memory 604 includes high-speed random access memory, such as DRAM, SRAM, DDR RAM or other random access solid state memory devices. In some embodiments the memory 604 includes non-volatile memory, such as one or more magnetic disk storage devices, optical disk storage devices, flash memory devices, or other non-volatile solid state storage devices. In some embodiments, the memory 604 includes one or more storage devices remotely located from the processing units 602. The memory 604, or alternately the non-volatile memory device(s) within the memory 604, comprises a computer readable storage medium.

In some embodiments, the I/O interface 606 couples one or more input/output devices, such as displays, a keyboards, touch screens, speakers, and microphones, to the I/O module 614 of the system 600. The I/O interface 606, in conjunction with the I/O module 614, receive user inputs (e.g., voice input, keyboard inputs, touch inputs, etc.) and process them accordingly. The I/O interface 606 and the I/O module 614 also present outputs (e.g., sounds, images, text, etc.) to the user according to various program instructions implemented on the system 600.

In some embodiments, the network communications interface 608 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi Fi, VoIP, WiMAX, or any other suitable communication protocol. The network communications interface 608 enables communication between the system 600 with networks, such as the Internet, an intranet and/or a wireless network, such as a cellular telephone network, a wireless local area network (LAN) and/or a metropolitan area network (MAN), and other devices. The communications module 616 facilitates communications between the system 600 and other devices (e.g., the first client device and the second client device) over the network communications interface 608.

In some embodiments, the operating system 602 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the system 600 is implemented on a portable electronic device (e.g., a smart phone, a mobile phone, a tablet computer, etc.). It should be noted that the system 600 is only one example, and that the system 600 may have more or fewer components than shown, may combine two or more components, or may have a different configuration or arrangement of the components. The various components shown in FIG. 6 may be implemented in hardware, software, firmware, including one or more signal processing and/or application specific integrated circuits, or a combination of thereof.

As shown in FIG. 6, the system 600 stores the operation control module 618 in the memory 604. In some embodiments, the operation control module 618 further includes the followings sub-modules, or a subset or superset thereof: a recording module 620 for recording the times for the previous charging actions (e.g., the previous trickle charging), a prompting module 622 for prompting the user of the time for the next charging action (e.g., the next charging action), a calendar module 624 for creating the corresponding calendar entries for the previous charging actions and future charging actions, an indicator display module 626 for displaying the various kinds of battery indicators for the different types of recommended charging or no-charging actions, and a charging optimization module 628 for determining the optimal charging cycles and charging times for each type of charging actions based on the user's past and present usage and charging behaviors. In some embodiments, the operation control module 618 optionally includes one or more other modules 630 and/or one or more other data structures 632 to provide other related functionalities described herein. Details on the structures, functions, and interactions of the operation control module 618 are provided with respect to FIGS. 1-5 and accompanying descriptions.

It should be noted that when the battery-charging management device provided in the abovementioned embodiments is carrying out battery-charging management, illustration is only made according to the division of the above-mentioned functional modules, and in practical application, the abovementioned functions can be assigned to be completed by different functional modules as required, i.e., dividing the internal structure of the device into different functional modules to complete all or some of the above-described functions. In addition, the battery-charging management device provided in the abovementioned embodiments belongs to the same concept as the battery-charging management method, and its specific implementation process is seen in the method embodiment, which will not be repeated here.

The sequence numbers of the abovementioned embodiments of the present invention are merely for the sake of description, and do not represent the advantages or disadvantages of the embodiments.

As stated above, in the embodiments of the preset invention, whether the interval from the previous trickle charging to the current time has exceeded a preset charging cycle is determined by recording the time for trickle charging carried out by a user and comparing same with the preset charging cycle, and if yes, the user will be prompted to carry out trickle charging again; otherwise, there is no need to prompt the user and the user continues to use the battery normally. Furthermore, the embodiments of the present invention can combine with a calendar, and record the time for the charging carried out by the user on the calendar, which can not only prompt the user to carry out trickle charging again but also prompt the user of the time when next trickle charging is needed after the charging has been completed. The charging cycle is managed in the embodiments of the present invention according to the recorded charging actions of the user; therefore, the user can be prompted and guided in an intuitive and clear way to carry out charging cycle management, and be prompted intelligently and regularly, so as to extend the service life of a battery.

A person skilled in the art can understand that all or some of the steps of the abovementioned embodiments can be implemented by hardware, and can also be implemented by a program instructing related hardware, and the program can be stored in a computer readable storage medium, and the abovementioned storage medium can be a read-only memory, a magnetic disk, or an optical disk, and so on.

What are described above are merely preferred embodiments of the present invention and are not used to limit the present invention, and any modifications, equivalent substitutions, improvements and so on made within the spirit and principles of the present invention shall all be contained in the protection scope of the present invention.

What is claimed is:

1. A method of battery-charging management, comprising:
at a device having one or more processors and memory:
recording a respective time that previous trickle charging of a device battery was carried out by a user;
based on the respective time for the previous trickle charging carried out by the user, creating, in a user calendar, a first calendar entry for the previous trickle charging of the device battery carried out by the user and a second calendar entry for next trickle charging of the device battery to be carried out by the user;
determining that a time interval between a current time and the respective time for the previous trickle charging has reached a preset charging cycle; and
prompting the user to carry out the next trickle charging of the device battery in response to determining that the time interval between the current time and the respective time for the previous trickle charging has reached the preset charging cycle.

2. The method of claim 1, further comprising:
concurrently displaying, in a user interface of the user calendar of the user, the first calendar entry for the recorded time for the previous trickle charging carried out by the user and the second calendar entry for the next trickle charging of the device battery to be carried out by the user.

3. The method of claim 1, further comprising:
recording a respective time for at least one of previous short time charging and previous normal charging carried out by the user.

4. The method of claim 1, further comprising:
prompting, after the user has completed the previous trickle charging of the device battery, the user of an amount of time left to the next trickle charging of the device battery according to the preset charging cycle.

5. The method of claim 1, further comprising:
prompting the user to carry out normal charging of the device battery when it is determined that the device battery's amount of remaining charge is below a preset threshold amount of remaining charge.

6. The method of claim 1, further comprising:
determining the amount of remaining charge and a rate of discharge for the device battery; and
based on the determined amount of remaining charge and rate of discharge, determining whether to prompt the user for normal recharging or trickle recharging.

7. The method of claim 1, further comprising:
providing a plurality of battery charging modes on the device, including at least two of a normal charging mode, a short time charging mode, and a trickle charging mode; and
varying a visual appearance of a battery charging indicator displayed on the device in accordance with a respective one of the plurality of charging modes currently recommended for recharging the device battery.

8. A system providing battery-charging management, comprising:
one or more processors; and
memory having instructions stored thereon, the instructions, when executed by the one or more processors, cause the processors to perform operations comprising:
recording a respective time that previous trickle charging of a device battery was carried out by a user;
based on the respective time for the previous trickle charging carried out by the user, creating, in a user calendar, a first calendar entry for the previous trickle charging of the device battery carried out by the user and a second calendar entry for next trickle charging of the device battery to be carried out by the user;
determining that a time interval between a current time and the respective time for the previous trickle charging has reached a preset charging cycle; and
prompting the user to carry out the next trickle charging of the device battery in response to determining that the time interval between the current time and the respective time for the previous trickle charging has reached the preset charging cycle.

9. The system of claim 8, wherein the operations further comprise:
concurrently displaying in a user interface of the user calendar of the user, the recorded time for the previous trickle charging carried out by the user and the second calendar entry for the next trickle charging of the device battery to be carried out by the user.

10. The system of claim 8, wherein the operations further comprise:
recording a respective time for at least one of previous short time charging and previous normal charging carried out by the user.

11. The system of claim 8, wherein the operations further comprise:
prompting, after the user has completed the previous trickle charging of the device battery, the user of an amount of time left to the next trickle charging of the device battery according to the preset charging cycle.

12. The system of claim 8, wherein the operations further comprise:
prompting the user to carry out normal charging of the device battery when it is determined that the device battery's amount of remaining charge is below a preset threshold amount of remaining charge.

13. The system of claim 8, wherein the operations further comprise:
determining the amount of remaining charge and a rate of discharge for the device battery; and
based on the determined amount of remaining charge and rate of discharge, determining whether to prompt the user for normal recharging or trickle recharging.

14. The system of claim 8, wherein the operations further comprise:
providing a plurality of battery charging modes on the device, including at least two of a normal charging mode, a short time charging mode, and a trickle charging mode; and
varying a visual appearance of a battery charging indicator displayed on the device in accordance with a respective one of the plurality of charging modes currently recommended for recharging the device battery.

15. A non-transitory computer-readable medium having instructions stored thereon, the instructions, when executed by one or more processors, cause the processors to perform operations comprising:
recording a respective time that previous trickle charging of a device battery was carried out by a user;
based on the respective time for the previous trickle charging carried out by the user, creating, in a user calendar, a first calendar entry for the previous trickle charging of the device battery carried out by the user and a second calendar entry for next trickle charging of the device battery to be carried out by the user;
determining that a time interval between a current time and the respective time for the previous trickle charging has reached a preset charging cycle; and
prompting the user to carry out the next trickle charging of the device battery in response to determining that the time interval between the current time and the respective time for the previous trickle charging has reached the preset charging cycle.

16. The computer readable medium of claim 15, wherein the operations further comprise:
concurrently display, in a user interface of the user calendar of the user, the first calendar entry for the recorded time for the previous trickle charging carried out by the user and the second calendar entry for the next trickle charging of the device battery to be carried out by the user.

17. The computer readable medium of claim 15, wherein the operations further comprise:
prompting, after the user has completed the previous trickle charging of the device battery, the user of an amount of time left to the next trickle charging of the device battery according to the preset charging cycle.

18. The computer readable medium of claim 15, wherein the operations further comprise:
prompting the user to carry out normal charging of the device battery when it is determined that the device battery's amount of remaining charge is below a preset threshold amount of remaining charge.

19. The computer readable medium of claim 15, wherein the operations further comprise:

determining the amount of remaining charge and a rate of discharge for the device battery; and based on the determined amount of remaining charge and rate of discharge, determining whether to prompt the user for normal recharging or trickle recharging.

20. The computer readable medium of claim 15, wherein the operations further comprise:

providing a plurality of battery charging modes on the device, including at least two of a normal charging mode, a short time charging mode, and a trickle charging mode; and varying a visual appearance of a battery charging indicator displayed on the device in accordance with a respective one of the plurality of charging modes currently recommended for recharging the device battery.

* * * * *